April 18, 1967   H. W. STIER   3,314,126
TOOLS
Filed April 7, 1966   3 Sheets-Sheet 1
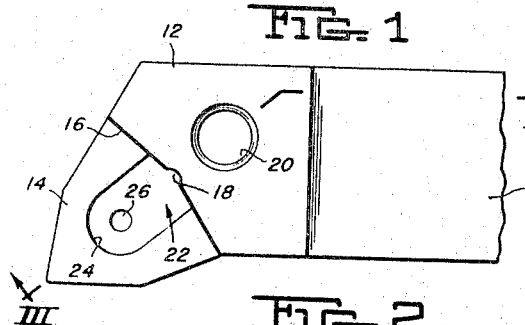
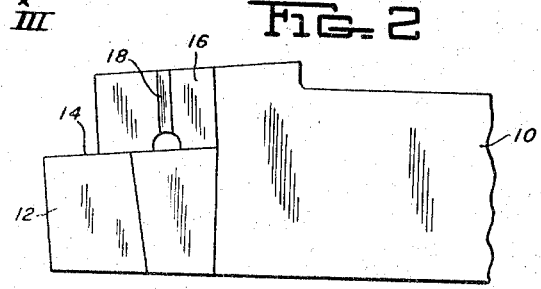
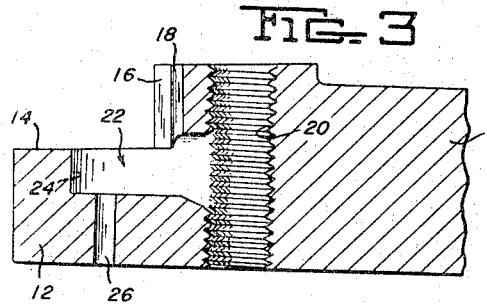
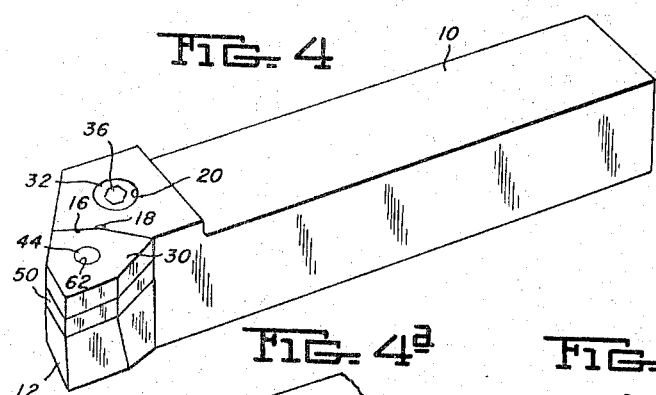
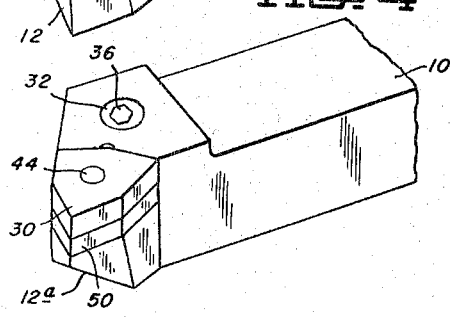
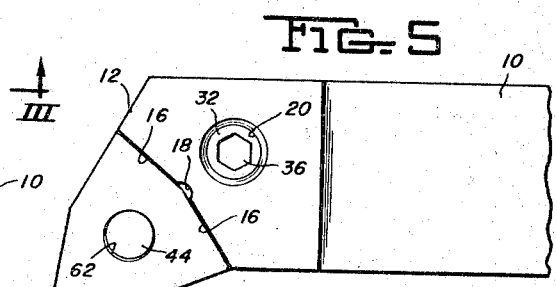
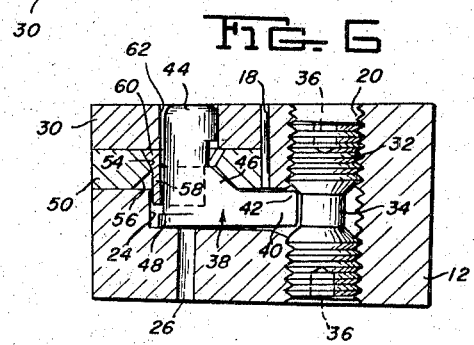
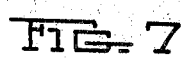
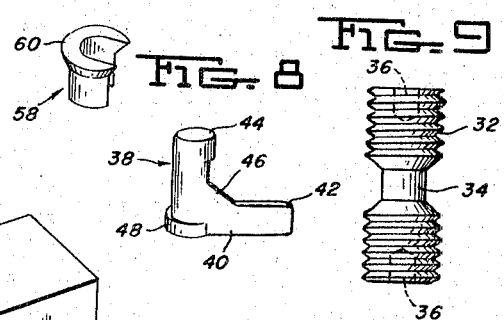
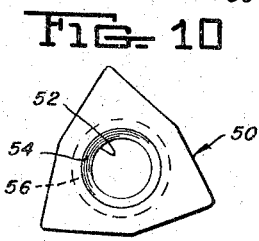
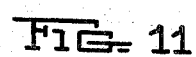
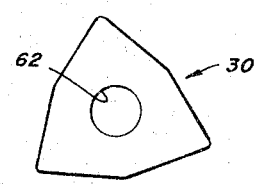
INVENTOR
HENRY W. STIER
By Robert T. Randig
Attorney

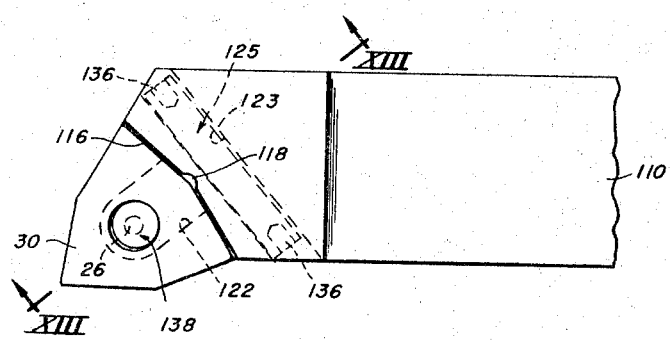
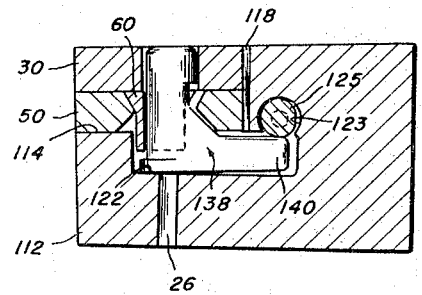
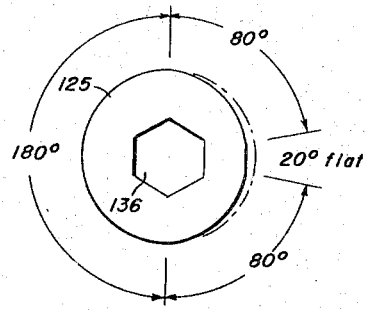
INVENTOR
HENRY W. STIER
BY Robert T. Bandig
Attorney April 18, 1967        H. W. STIER        3,314,126
TOOLS
Filed April 7, 1966        3 Sheets-Sheet 3
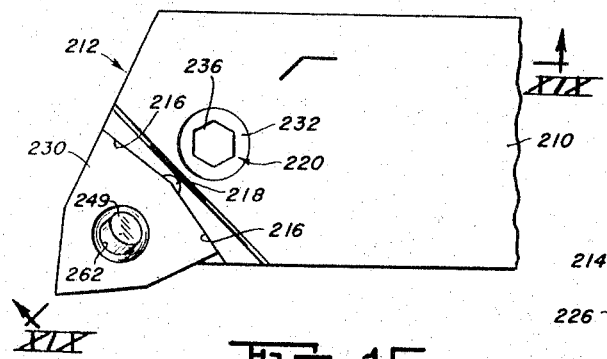
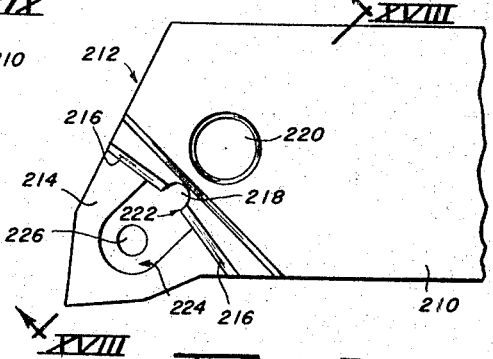
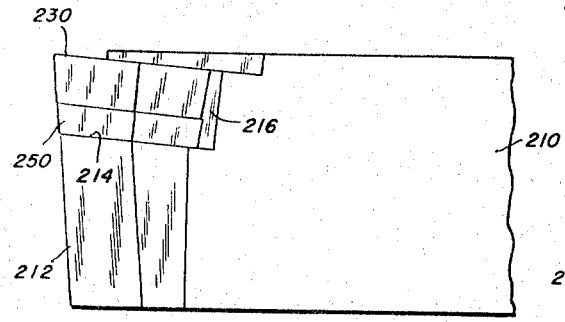
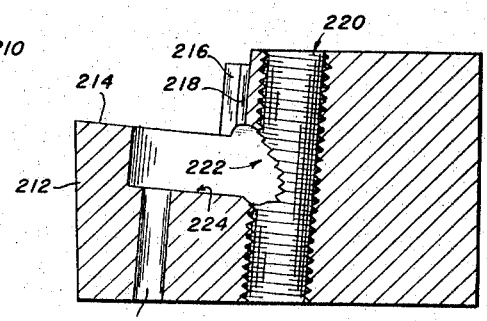
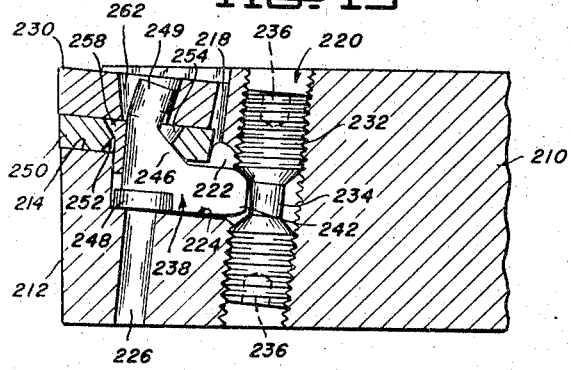
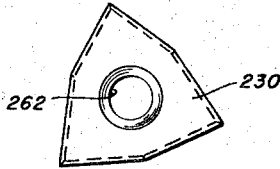
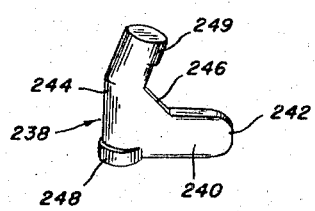
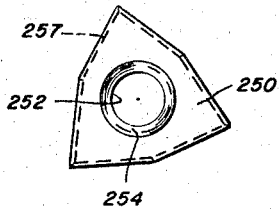
INVENTOR
HENRY W. STIER
BY *Robert T. Bandig*
Attorney

United States Patent Office 3,314,126
Patented Apr. 18, 1967

3,314,126
TOOLS
Henry W. Stier, Dearborn Heights, Mich., assignor to Carmet Company, Pittsburgh, Pa., a corporation of New Jersey
Filed Apr. 7, 1966, Ser. No. 540,972
12 Claims. (Cl. 29—96)

This invention relates generally to cutting tools, and more particularly to cutting tools with replaceable tips or inserts such as indexable carbide inserts.

One of the principal objects of this invention is to provide a pin type locking mechanism for cutting tool inserts which is operable both from the top and the bottom of the tool shank or opposite sides thereof.

A further object of this invention is the provision of a locking mechanism for inserts for cutting tools which will provide a positive locking action free of torsional stresses on the inserts.

Still another object of this invention is to provide a locking mechanism in a cutting tool which will allow facile removal and replacement of inserts without necessitating the removal of the tool from its holder.

Yet an additional object of this invention is to provide a relatively simple locking mechanism for a cutting tool insert which can be tightened with a great deal of force without breaking or distorting the position of the insert.

These and other objects, together with a fuller understanding of the invention, will become apparent from the following description when taken in conjunction with the accompanying drawings in which:

FIGURE 1 is a plan view of a portion of a tool holder constructed according to this invention with the locking mechanism and insert removed;

FIG. 2 is an elevational view of the tool holder of FIG. 1;

FIG. 3 is a sectional view taken substantially along the plane of line III—III of FIG. 1;

FIG. 4 is a perspective view of the tool holder with one embodiment of a locking mechanism according to this invention locking a support and tool bit in position;

FIG. 4a is a perspective view of a tool holder with the head modified with a relief milled thereon;

FIG. 5 is a plan view of the tool holder assembly of FIG. 4;

FIG. 6 is a sectional view taken substantially along the plane of line VI—VI of FIG. 5; (Note, there is no section line shown in drawing);

FIG. 7 is a perspective view of the spring clip used in the assembly shown in FIGS. 4 through 6;

FIG. 8 is a perspective view of the insert locking member used in the assembly of FIGS. 4 through 6;

FIG. 9 is an actuating screw used in the assembly of FIGS. 4 through 6;

FIG. 10 is the insert support shown in the assembly of FIGS. 4 through 6;

FIG. 11 is a cutting bit used in the assemblies of FIGS. 4 through 6;

FIG. 12 is a plan view of a tool holder having another embodiment of a locking mechanism according to this invention;

FIG. 13 is a sectional view taken substantially along the plane XIII—XIII of FIG. 12;

FIG. 14 is a detail view of the actuating pin of the device of FIGS. 12 and 13;

FIG. 15 is a plan view of another embodiment of this invention illustrating a portion of the tool holder characterized by a positive rake;

FIG. 16 is an elevational view of the tool holder of FIG. 15;

FIG. 17 is a plan view of the tool holder of FIG. 15 with the locking mechanism, shim and insert removed;

FIG. 18 is a sectional view of a portion of the tool holder taken along the line XVIII—XVIII of FIG. 17;

FIG. 19 is a sectional view of a portion of the tool holder taken along the line XIX—XIX of FIG. 15;

FIG. 20 is a perspective view of the locking member used in the assembly of FIGS. 15 through 19;

FIG. 21 is a view of the insert shown in FIGS. 16 and 19, and

FIG. 22 is a view of the support shown in FIGS. 16 and 19.

Referring now to the drawings, and for the present to FIGS. 1 through 3, there is illustrated a tool holder comprising a shank 10 and a head 12. In this embodiment, the shank 10 is square in cross section, and the head 12 is formed as an integral part therewith and extending at an angle therefrom. The head 12 is provided with a recess which comprises a base surface 14 and an end wall 16 extending at a right angle from the base surface 14. The end wall 16 is provided with a relieved portion 18 which will collect loose debris and prevent the lodging of such debris and other matter between the insert and the wall 16.

The head is provided with a through-threaded bore 20, the axis of which is substantially parallel to the end wall 16. A passageway 22 is milled in the base surface 14 of the recess and extends to and communicates with the threaded bore 20. The passageway 22 has an enlarged end portion 24 which functions to provide a seat for the locking member to be more fully described. The head 14 may also be provided with a bore 26 disposed centrally within the end portion 24 and extending through the head 12 to the opposite surface.

Referring now to FIGS. 4 through 6, the locking mechanism is shown inserted in the head 12 of the tool, and is shown locking a carbide insert 30 in place. The locking mechanism includes a screw 32 threadably engaged in the bore 20, said screw being provided with a reduced diameter center section 34 which is positioned adjacent the passageway 22 when the screw is in place and with sockets 36 at the opposite ends thereof adapted to receive an Allen wrench or other suitable tools for rotating the screw. A generally L-shaped locking member 38 (shown in detail in FIG. 8) is disposed in seating engagement in the passageway 22 and comprises a horizontal leg 40 which extends to the bore 20 and terminates in an end section 42 disposed to engage the reduced diameter section 34 of the screw 32 and a vertical leg 44 having a height to at least extend above the surface 14 of the head 12. For added strength, the locking member 38 has a filleted portion 46 between its two legs and an enlarged collar section 48 disposed for seating engagement in the end portion 24 of the passageway 22.

As stated previously, the tool holder of the present invention is particularly suitable for use in holding a material such as a carbide insert and locking the same into position. For facilitating easy indexing of the carbide insert, a support 50 is provided which has a central bore 52 of a larger diameter than the diameter of the leg 44 of the locking member 38 (see FIG. 10) and is disposed for seating engagement between the carbide insert 30 and the surface 14. The bore 52 is chamferred at both ends as shown at 54 and 56. A spring clip 58 is provided having an enlarged collar 60 (see FIG. 7). The spring clip 58 is inserted in the support 50 with the collar 60 residing in the chamferred end 54. The support 50 and spring clip 58 are disposed over the horizontal leg 44 of the locking member 38, and the shank of the spring clip extends into the passageway 22 and secures the support 50 by its spring action on the surface 14 of the head 12. As can be seen in FIG. 6, the split or open section of the spring clip faces in the direction of the screw 32. With the support 50 and locking ring assembly inserted as shown in FIGS. 3 through 6, the support is firmly held in place. It is preferred that a support pad of some type, and preferably of that shown and described, be utilized for this type of tool to afford a firm support base for the carbide tool bit and prevent its cracking in use. However, it is to be understood that it is not essential to the functioning of this invention that such a support pad be incorporated.

Referring still to FIGS. 4 through 6, an indexable carbide insert 30 of the type shown in FIG. 11 and having a central bore 62 slightly larger than the diameter of the vertical leg 44 is placed over the vertical leg 44 of the locking member 38 and rests on the upper surface of the support 50. This insert can be locked firmly in place by the locking mechanism as will be described. The tool holder of FIG. 4a is similar to that of FIG. 4, but the head 12 has a relief milled thereon for use in boring operations.

With respect to the operation of the tool holder shown in FIGS. 1 through 6, first the screw 32 is threaded into the bore 20 until the reduced diameter portion 34 is adjacent the passageway 22. The locking member 38 is then inserted into the passageway 22 and rests on the base surface with the collar 48 nested in the enlarged portion 24 of said passageway 22. The end 42 of the leg 44 is engaged in the reduced diameter section 34 of the screw 32. The support 50 is then placed over the leg 44 of the locking member 38 and the spring clip 58 is inserted through the bore 52 of the support 50. The assembly as described so far will normally be left intact, and the inserts removed and indexed or replaced. The insert 30 is placed over the leg 44 of the clamp 38. The clamping action takes place as follows: an Allen wrench is inserted in either of the sockets 36 and the screw is turned to move it downwardly (as shown in FIG. 6). This downward movement will cause a pivoting action of the locking member 38 about the collar 48, and this pivoting action will cause the leg 44 to move to the right (as seen in FIG. 6) toward the wall 16. The leg 44 will engage the cutting insert 30 and force it against the wall 16, thereby exerting a clamping action on the tool bit. This clamping force is free of torsional movement against the insert since the twisting motion of the screw 32 is translated into a force vector solely in the direction toward the wall 16. Hence there will be no tendency to twist the tool bit as is the case in those types of tool holders wherein a screw is provided at an angle to the locking surface and twisting motion of the screw results in torsional forces on the tool bit as well as forces toward the clamping surface. To replace the tool bit, the screw 32 is rotated in the opposite direction, causing the locking member 38 to pivot back, moving the leg 44 in a direction away from the wall 16, and releasing the clamping force. The insert 30 can then be removed and indexed or replaced. When the insert 30 is removed, the support 50 is retained in place securely by the spring clip 58 and normally will not be removed; hence there is no tendency for the whole assembly to come apart. However, if it is desired to remove the support 50, it can be pried loose relatively simply by using a knife or other similar type instrument and inserting it between the lower surface of the support 50 and the base surface 14 of the recess. The knife is twisted and worked to loosen the support pad which is held securely but not permanently in place by the spring clip 58. When the support 50 and clip 58 are removed, the remainder of the mechanism can be easily lifted from the passageway 22.

Referring now to FIGS. 12 through 14, another embodiment of the locking mechanism is shown. The tool holder has a shank 110 with a somewhat modified head portion 112. The head portion includes a tool bit receiving recess comprising a flat base surface 114 and an end wall 116 extending at a predetermined angle from the base surface 114. The end wall 116 is provided with a relieved portion 118, and a passageway 122 is milled in the lower surface 114. A bore 26 is also provided centrally of passageway 122 and extends from the passageway 122 to the base surface of the head 112. This much of the tool holder is substantially the same as that of the previously disclosed embodiment. However, in this embodiment a transverse smooth circular bore 123 is provided which communicates with the passage 122. An eccentric actuating pin 125 is disposed in the bore 123. The opposite ends of the pin 125 are provided with Allen wrench sockets 136 so that the pin 125 may be rotated within the bore 123. The pin 125 bears against leg 140 of the L-shaped locking member 138 disposed in the recess 122. Because of the eccentric shape of the pin 125, rotation thereof will cause a pivoting action of the L-shaped member 138 which, in the same manner as described with respect to the embodiments of FIGS. 1 through 6, will cause leg 144 of the locking member 138 to lock the insert 30 in place. The inserts 30, supports 50 and spring clips 58 used in this embodiment are the same as described previously with respect to the embodiments of FIGS. 1 through 11.

FIG. 14 shows in detail the preferred cross sectional configuration of the pin 125. While most any cam pin will effectively provide the leverage for pivoting locking mechanism 138, in this embodiment it is preferred that the cam pin 125 assume the configuration which is essentially a pair of Archimedean spirals superimposed upon a circle starting at a given point and extending 180° in opposite directions. Each of these spirals preferably extends 80°, and the remaining 20° is preferably flat. The gradient angle or degree of rise of the spirals should be less than 5%, and this preferred embodiment provides a locking action which will not be loosened by vibration of the tool in service. With the configuration as shown, i.e. two Archimedean spirals, rotation of the locking pin 125 in either direction from its low point will cause a pivoting action to lock the insert securely in place. This embodiment achieves a locking action by rotation of a pin in the absence of any threads, which eliminates all of the disadvantages of threaded bores and screws.

While the foregoing embodiments were described with respect to FIGS. 1 through 14, inclusive, and illustrate a tool holder having a negative rake, substantially the same inventive concept can be utilized in the production of a tool holder having a positive rake. It will, of course, be appreciated by persons skilled in the art that the production of such a hool holder requires slightly differing engineering considerations in order to provide the various components with the proper clearances, yet utilizing the same fundamental concept.

In order to illustrate a tool holder having a positive rake, reference is directed to the drawings, and in particular to FIGS. 15 through 17, inclusive, where there is illustrated a tool holder having a positive rake and comprising a shank 210 and a head 212 which is attached to and is integral with the shank 210. As with the other embodiments described hereinbefore, the shank 210 is preferably square in cross section, although this facet is not a limitation, and the head 212, which is integral therewith, preferably extends at an angle therefrom as more clearly shown in FIGS. 15 and 17. The head 212 is provided with a recess which comprises a base surface 214 and an end wall 216 extending at a predetermined angle from the base surface 214, said predetermined angle preferably exceeding a right angle by the degree of clearance provided the cutting insert as will be described. As clearly illustrated in FIGS. 16 and 18, the base surface 214 forms an acute angle with a plane which is vertically perpendicular to a longitudinal axis through the shank 210 of the tool holder. Where desired, a relieved portion 218 is provided in the end wall 216, and while the same may function to collect loose debris and prevent the lodging of such debris and other matter between the insert and the wall 216, it is nonetheless a manufacturing expedient because of the difficulty of forming an angle in the end wall in order to accommodate the insert in complete seating engagement. The head is also provided with a bore 220, the axis of which is substantially perpendicular to the base surface 214 of the head 212. A passageway 222 is provided in the base surface 214 of the recess and extends to and communicates with the bore 220. The passageway 222 has an enlarged end portion 224 which functions to provide a seat for the locking member, to be more fully described hereinafter. The head 214 may also be provided with a bore 226 disposed centrally within the end portion 224 and extending through the head 212 to the opposite surface.

Referring now to FIGS. 18 through 20, inclusive, the locking mechanism is shown inserted in the head 212 of the tool and is shown locking a cutting insert 230 in position. The locking mechanism includes a screw 232 which is threadably engaged in the bore 220, said screw being provided with a reduced diameter center section 234 which is positioned adjacent the passageway 222 when the screw is in place. The screw 232 is provided with sockets 236 at opposite ends thereof which are adapted to receive an Allen wrench or other suitable tools for rotating the screw. A generally L-shaped locking member 238 is disposed in seating engagement in the enlarged portion 224 of the passageway 222 and comprises a substantially horizontal leg 240 which extends into the bore 220 through the head 212 and terminates in an end section 242 which is disposed to engage the reduced diameter section 234 of the screw 232, and a vertical leg 244 having a height at least sufficient to extend above the surface 214 of the head 212. For added strength, the locking member 238 has a filleted portion 246 between its two legs and an enlarged collar section 248 disposed for seating engagement in the end portion 224 of the passageway 222. As stated hereinbefore, the present description is germane to that of a tool having a positive rake. Since sufficient clearance must be given for the tool having a positive rake, it becomes necessary to make certain structural changes, and in this instance the locking member 238 is provided at its upper extremity of the vertical leg 244 with an inclined tip 249, said tip having a predetermined angular disposition. Since the locking member 238 is disposed for pivotal movement about the collar 248, it will be appreciated that in this embodiment it is difficult to obtain line contact between the inclined tip 249 and the wall of the opening 262 within the cutting insert 230. It is preferred, however, to provide the inclined tip 249 with sufficient slope that the upper extremity engages the wall 262 and secures the cutting insert 230 in clamping engagement with the wall 216 of the recess. Ideally, this slope is slightly greater than one-half the included angle of the central bore of the cutting insert.

Since the tool holder of the present invention is utilizable with cutting inserts of the indexable variety, it is preferred to provide the tool of the present invention with a support 250, which support is provided with a central bore 252, the same to have a large diameter than the diameter of the leg 244 of the locking member 238, and said support 250 is disposed for seating engagement between the carbide insert 230 and the base surface 214. The central bore 252 of the support 250 is chamferred at both ends, only one of which is shown in FIG. 22 at 254. Since the support 250 rests between the carbide insert 230 and base surface 214, it must also have sufficient relief in order to provide proper cutting clearances, and for this reason the support is provided with clearances 257 as shown in chain outline in FIG. 22. A spring clip 258 of the same design as that illustrated in FIG. 7 can be utilized with the support 250 and secures the locking member 238 within the passageway 222 to function in the same manner as that described with respect to FIG. 7. It is preferred that a support pad of some type, and preferably that shown and described, be utilized for this type of tool in order to afford a firm support base for the cutting insert and prevent its cracking in use. In addition, the support also aids in the easy releasing and indexing of the cutting insert.

Referring to FIGS. 16, 19 and 21, an indexable cutting insert 230, of the type shown in FIG. 21 and having a central bore 252, is placed over the vertical leg 244 of the locking member 238 and rests on the upper surface of the support 250. The carbide insert 230 for use with a positive rake requires that a clearance angle for the cutting edge be provided such that the same exceeds the degree of positive rake. Thus, when the cutting insert 230 is placed on the support 250 and the same is secured in clamping engagement with the wall 216 of the recess, clearance between the cutting edge and the workpiece is provided. After fixing the clearance angle as aforesaid, the slope of the walls of the central bore may be determined such that the included angle is preferably equivalent to twice the clearance angle of the cutting insert. Thus, with this relationship maintained, substantially parallel surfaces are provided for locking the insert into position with the end wall 216. Ideally, the tip 249 of the locking member 238 and its inclined angle coincide, so that the insert 230 is firmly secured on the support 250 and locked in position thereon.

The operation of the tool holder with a positive rake is essentially the same as that described hereinbefore with respect to the tool holder having a zero or negative rake.

It will be further appreciated that while the embodiment described with respect to FIGS. 15 through 22, inclusive, was that of a tool holder with a positive rake utilizing a locking mechanism which included a threaded bore as described therein, the actuating means for pivoting the locking mechanism 238 can also be the same as that described hereinbefore with respect to FIG. 14.

I claim:
1. A tool holder comprising
 a shank,
 a head having a bore therethrough, said head having
  a recess formed of
   a base surface,
   a wall intersecting the base surface, and
   a passageway disposed beneath the base surface and communicating with the bore of the head,
 a support disposed in seating engagement on the base surface of the head and having a centrally disposed opening therein,
 a cutting insert having a central opening therein and disposed in an aligned relationship with the opening of the support,
 locking mechanism disposed to secure the cutting insert into clamping engagement with the wall intersecting the base surface, said locking mechanism including
  a generally L-shaped locking member having a vertically extending leg disposed within the aligned opening of the support and the cutting insert,
  a horizontally extending leg disposed within the passageway in communication with the bore, and actuating means disposed within the bore to pivot the locking member to thereby secure the cutting insert into locking engagement with the wall of the recess.

2. The combination of claim 1 in which the bore through the head is generally perpendicular to the base surface of the head and the actuating means includes screw means threadably engaged in the head and operably engageable with the L-shaped member.

3. The combination of claim 1 in which the bore through the head is generally horizontal and the actuating means includes a cam pin operably engageable with the horizontal leg of the L-shaped member.

4. A tool holder comprising,
a shank,
a head having a bore therethrough, said head having a recess formed of
a base surface,
a wall intersecting the base surface, and
a passageway disposed beneath the base surface and communicating with the bore of the head,
a substantially L-shaped locking member disposed for seating engagement within the passageway,
said locking member having a substantially horizontally extending leg,
a generally vertically extending leg, and
a collar portion at the intersection of the horizontally and vertically extending legs,
a cutting insert having a central opening therein and disposed in seating engagement on the head with the vertical leg of the locking member extending into the central opening,
means for securing the locking member in place, and
means for actuating the locking mechanism.

5. The combination of claim 4 in which the bore through the head is generally perpendicular to the base surface of the head and the actuating means includes screw means threadably engaged in the head and operably engageable with the horizontally extending leg of the L-shaped locking member.

6. The combination of claim 4 in which the bore through the head is generally horizontal and the actuating means includes a cam pin operably engageable with the horizontally extending leg of the L-shaped locking member.

7. A tool holder comprising,
a shank,
a head having a bore therethrough, said head having a recess formed of
a base surface,
a wall intersecting the base surface, and
a passageway disposed beneath the base surface and communicating with the bore of the head,
a generally L-shaped locking member disposed for seating engagement within the passageway, said L-shaped locking member having
a vertically extending leg,
a horizontally extending leg having an end section, and
a collar portion at the intersection of the horizontally and vertically extending legs,
a support having a central opening and disposed for seating engagement on the base surface with the vertical leg of the locking mechanism extending through the central opening,
spring means disposed to secure said support and locking member in place,
a cutting insert having a central opening therein and disposed for seating engagement on the shim, said central opening of the cutting insert having a diameter at least sufficiently large to accept the vertical leg and small enough to engage the opening and move the insert into clamping engagement with the wall of the recess, and
means for actuating the locking member.

8. The combination of claim 7 in which the bore through the head is generally perpendicular to the base surface of the recess, the means actuating the locking member includes screw means threadably engaged in the head and having a reduced diameter central section and wherein the end section of the substantially horizontally extending leg of the locking member is engaged with said reduced section diameter to pivot said locking member about the collar thereof to secure said cutting insert in clamping engagement with the wall of the recess.

9. The combination of claim 7 in which the bore through the head is generally horizontal, the means actuating the locking member includes a cam pin characterized by having a configuration which is essentially a pair of Archimedean spirals superimposed on a circle starting at a given point and extending 180° in opposite directions and in which the gradient angle or degree of rise of the spirals does not exceed 5% and in which said end section of the substantially horizontally extending leg of the locking member is engaged with said cam pin to pivot said locking member about the collar thereof to secure said cutting insert in clamping engagement with the wall of the recess.

10. A tool holder characterized by possessing a positive rake and comprising,
a shank having a longitudinal axis,
a head having a bore therethrough, said head having a recess formed of
a base surface, the plane of which forms an acute angle with the plane perpendicular to the axis of the shank,
a wall intersecting the base surface at a predetermined angle thereto and
a passageway disposed beneath the base surface and communicating with the bore of the head,
a support disposed in seating engagement on the base surface of the head and having a centrally disposed opening therein and having a clearance angle at least equal to the degree of positive rake,
a cutting insert having a central opening therein and disposed in an aligned relationship with the opening of the support, said cutting insert having a clearance angle at least equal to the degree of positive rake and the central opening having sloping walls to provide an included angle of double the degree of positive rake,
locking mechanism disposed to secure the cutting insert into clamping engagement with the wall intersecting the base surface, said locking mechanism including
a generally L-shaped locking member having a vertically extending leg disposed within the aligned opening of the support and the cutting insert and terminating in an inclined tip having a predetermined slope,
a horizontally extending leg disposed within the passageway in communication with the bore, and
actuating means disposed within the bore to pivot the locking member to thereby secure the cutting insert into locking engagement with the wall of the recess.

11. The combination of claim 10 in which the bore through the head is generally perpendicular to the base surface of the recess, the means actuating the locking member includes a screw means threadably engaged in the bore of the head and having a reduced diameter central section and wherein the substantially horizontally extending leg of the locking member terminates in an end section which is engaged with the reduced diameter central section to pivot said locking member to secure the cutting insert in clamping engagement with the wall of the recess.

12. The combination of claim 10 in which the bore through the head is generally horizontal, the means actuating the locking member includes a cam pin characterized by having a configuration which is essentially a pair of Archimedean spirals superimposed on a circle starting at a given point and extending 180° in opposite directions and in which the gradient angle or degree of rise of the spirals does not exceed 5% and in which the horizontally extending leg of the locking member terminates in an end section which is engaged with the cam pin to pivot said locking member to secure said cutting insert in clamping engagement with the wall of the recess.

References Cited by the Examiner

UNITED STATES PATENTS

| | | | |
|---|---|---|---|
| 3,137,059 | 6/1964 | Hertel | 29—96 |
| 3,146,656 | 9/1964 | Richards | 29—96 X |
| 3,154,974 | 11/1964 | Greenleaf | 29—96 X |
| 3,226,797 | 1/1966 | Hertel | 29—96 |
| 3,238,600 | 3/1966 | Milewski | 29—96 |

WILLIAM W. DYER, JR., *Primary Examiner.*

HARRISON L. HINSON, *Examiner.*